(12) United States Patent
Vasechkin et al.

(10) Patent No.: US 6,426,862 B1
(45) Date of Patent: Jul. 30, 2002

(54) CAPACITOR WITH DUAL ELECTRIC LAYER

(75) Inventors: Vladimir Ivanovich Vasechkin, Moskovskaya obl.; Jury Mironovich Volfkovich, Moscow; Pavel Andreevich Shmatko, Moskovskaya obl.; Evgeny Alexandrovich Ashmarin, Moskovskaya obl.; Andrei Viktorovich Baskakov, Moskovskaya obl.; Alexandr Fedorovich Buldyaev, Moskovskaya obl.; Oleg Grigorievich Dashko, Moskovskaya obl., all of (RU)

(73) Assignee: Nauchno-Proizvodstvennoe Predpriyatie "EXIN", Moscow (RU)

( * ) Notice: Subject to any disclaimer, the term of this patent is extended or adjusted under 35 U.S.C. 154(b) by 0 days.

(21) Appl. No.: 09/581,738

(22) PCT Filed: Dec. 18, 1997

(86) PCT No.: PCT/RU97/00411

§ 371 (c)(1),
(2), (4) Date: Aug. 16, 2000

(87) PCT Pub. No.: WO99/31688

PCT Pub. Date: Jun. 24, 1999

(51) Int. Cl.$^7$ .................................................. H01G 9/00
(52) U.S. Cl. ...................... 361/502; 361/509; 361/523; 361/528; 361/512; 19/25.03
(58) Field of Search ................................. 361/502, 512, 361/508, 516, 523, 525, 528, 504, 509, 503, 511, 510; 29/25.03

(56) References Cited

U.S. PATENT DOCUMENTS

| | | | |
|---|---|---|---|
| 4,313,084 A | | 1/1982 | Hosokawa et al. |
| 4,438,481 A | * | 3/1984 | Phillips et al. .............. 361/433 |
| 4,562,511 A | | 12/1985 | Nishino et al. |
| 4,674,010 A | | 6/1987 | van den Steen |
| 5,082,594 A | * | 1/1992 | Tsuzuki et al. ............. 252/502 |
| 5,777,428 A | * | 7/1998 | Farahmandi et al. ........ 313/352 |
| 6,021,039 A | * | 2/2000 | Inagawa ..................... 361/502 |
| 6,031,712 A | * | 2/2000 | Kurihara et al. ............ 361/502 |
| 6,064,561 A | * | 5/2000 | Harada et al. .............. 361/502 |
| 6,195,252 B1 | * | 2/2001 | Belyakov et al. ........... 361/502 |

FOREIGN PATENT DOCUMENTS

| | | |
|---|---|---|
| DE | 38 02 712 | 8/1988 |
| RU | 603 353 | 3/1978 |
| RU | 809 420 | 2/1981 |
| WO | 92/12521 | 7/1992 |
| WO | 97/07518 | 2/1997 |

* cited by examiner

Primary Examiner—Dean A. Reichard
Assistant Examiner—Nguyen T Ha
(74) Attorney, Agent, or Firm—Collard & Roe, P.C.

(57) ABSTRACT

A capacitor with dual electric layer, wherein one of the electrodes is made of a porous carbon material and the other capacitor, of a material containing lead sulfate. The capacitor features enhanced characteristics and lower cost.

4 Claims, 3 Drawing Sheets

CAPACITOR WITH DUAL ELECTRIC LAYER

TECHNICAL FIELD

The invention relates to electrical engineering, in particular, to capacitor-making industry and can find application in producing high-capacity electric capacitors making use of double electric layer (DEL). Capacitors with DEL have found application as stand-by power sources in systems requiring uninterrupted power supply, such as computation engineering, communications equipment, numerically controlled machine tools, in uninterrupted cycle production processes; for electric-starter starting of diesel engines; for power supply of invalid carriages, golf carriages, and so on.

BACKGROUND ART

Known in the art presently are electric energy accumulators appearing double electric layer (DEL) capacitors, e.g., those disclosed in U.S. Pat. No. 4,313,084 (1982) and U.S. Pat. No. 4,562,511 (1985). Said capacitors comprise each two porous polarizable electrodes and porous separator made of a dielectric material and placed therebetween, and current leads. A liquid electrolyte solution in the capacity of which either aqueous or non aqueous electrolytes (aqueous sulfuric acid inclusive) are used, is contained in the pores of the electrodes and separator, as well in a certain free space inside the capacitor casing. Electric charge is accumulated at the interface in the pores between the electrode material and the electrolyte. Used as the materials of polarizable electrodes are various routine porous carbon materials. To increase the capacitor capacitance with double electric layer said carbon materials are subjected to preactivation with a view to increasing their specific surface area up to 300–3000 sg.m/g.

DEL capacitors possess much higher capacitance compared with routine film-type and electrolytic capacitors, amounting to a few scores farads per gram of active electrode materials. However, said capacitors suffer from the disadvantage that they have but rather low specific energy, i.e., as low as 3 W-h/lit. In this case maximum specific energy values are attainable with dual-layer capacitors using non-aqueous electrolytes for which the maximum voltage is within 3 and 3.5 V. However, such capacitors allow very low charging and discharge current values to be obtained, which is due to very low conductivity values of non-aqueous electrolytes. For dual-layer capacitors using aqueous electrolytes featuring maximum voltage value of 0.8 V still lower specific energy values are attainable, i.e., 0.5 to 2 W-h/lit. When such dual-layer capacitors are in a charged state for a rather prolonged period of time with voltage exceeding 0.8 V, noticeable oxidation of the positive carbon electrode occurs.

Closest to the proposed invention as to the technical essence and attainable effect is a DEL capacitor comprising two electrodes and liquid electrolyte (i.e., an aqueous alkali-metal hydroxide with a concentration of 3 to 7 mole/lit having a polarizable (negative) electrode made of a carbon fibrous material and a non-polarizable electrode made of nickel oxide. Maximum voltage of said capacitor equals 1.4 V and specific capacitance and specific energy, 46 F/cu.cm and 45 J/cu.cm, respectively (WO 97/07518 dated Feb. 27, 1997).

However, the capacitor in question suffers from a number of disadvantages such as inadequately high specific energy and high cost accounted for by use of large amounts of nickel oxide.

DISCLOSURE OF THE INVENTION

It is an object of the present invention to provide a DEL capacitor featuring a higher specific energy.

It is another object of the invention to reduce the production cost of the capacitor involved. The foregoing objects are accomplished due to the invention disclosed hereinbelow the essence of which resides in that the capacitor in question has a polarizable electrode made from a porous carbon material and a non-polarizable electrode made from a material comprising lead sulfate as an active component, as well as in that used as electrolyte is an aqueous solution containing sulfuric acid.

It is preferable that the capacitor incorporate a current lead provided with a protective coating made from graphite foil impregnated with an acid-resistant polymer.

It is expedient that the capacitor also incorporate two polarizable electrodes, one non-polarizable electrode, and two separators, all of said component being arranged in the following order: the first polarizable electrode/the first separator/the non-polarizable electrode/the second separator/the second polarizable electrode, both of the negative electrodes being short-circuited on each other. With such an arrangement of the electrodes and separators the specific capacitance of the polarizable (negative) electrode is substantially lower than that of the non-polarizable (positive) electrode, whereby a total thickness of the negative electrode is much larger than that of the positive electrode. Hence the herein-proposed splitting of one negative electrode into two electrodes having half-thickness each provides for virtually one-half reduction of ohmic loss of energy with rather high current density values.

It is also expedient that the material of one or all electrodes is doped with a particulate material, such as polytetrafluoroethylene or polyethylene. First, this makes it possible to produce the negative electrode from not only a fibrous carbon material (e.g., a carbon fabric which is the case with the known capacitor (cf. WO application # 97/07,518) but also from a material based on carbon powders with the use of a polymer binder. The latter electrode is much cheaper one. Secondly, use of a polymer binder makes possible attaining an increased strength of both the negative electrode and the positive (lead-sulfate) one.

It is expedient that one capacitor or a bank of capacitor elements be compressed between the load-bearing covers of the casing so as to considerably reduce the capacitor internal resistance, especially when using negative electrodes from carbon fabric or felt, and to prevent the active material of the positive electrode from shedding which is one of the principal causes that restrict cyclicity of the DEL capacitors made according to WO application # 971/07,518. It is due to the above specified technical solutions that it is possible to essentially increase the specific energy and to reduce the cost of capacitors. An increase in the specific energy up to 2.0 V is provided due to a 1.5-times increase in the electric conduction of the sulfuric-acid electrolyte compared with the alkaline one. The cost of a DEL capacitor made in accordance with the present invention is decreased due to the use of a lead-sulfate electrode which is much cheaper than a nickel-oxide one. Use of lead sulfate as the active material of the positive electrode provides a possibility of using diluted sulfuric acid as electrolyte which facilitates much the assembling of the DEL capacitors involved.

Figure 1:
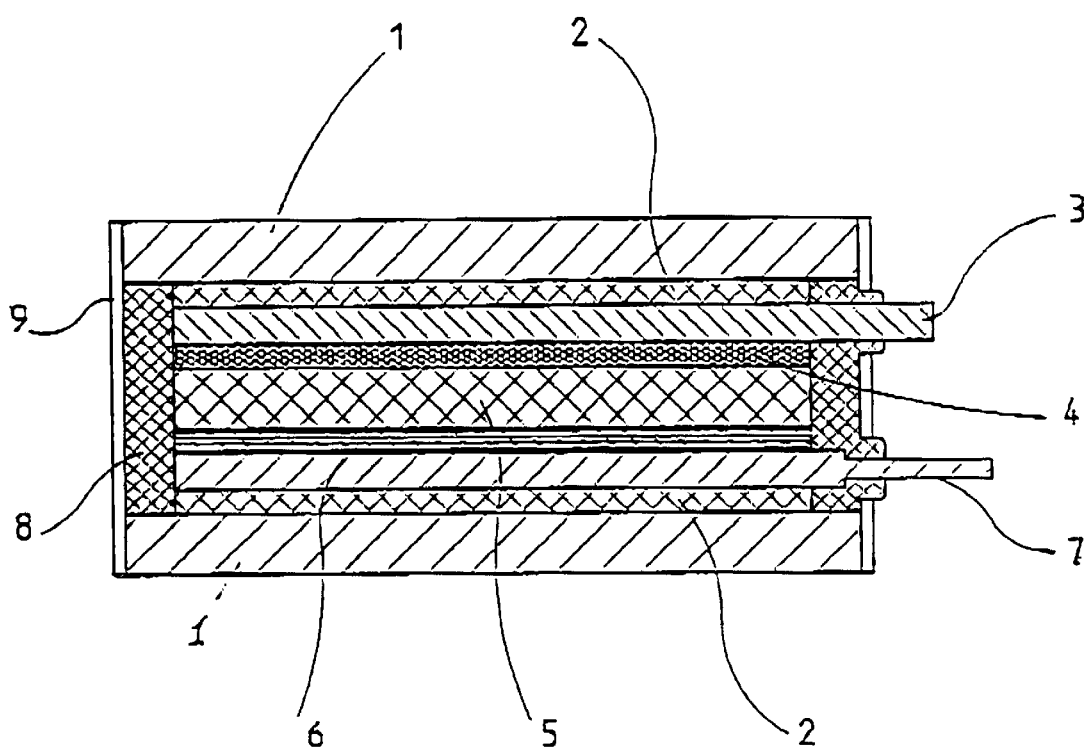
FIG. 1 illustrates the capacitor, according to the present invention.

The following Reference Numerals in the Figures denote as follows: 1—load-bearing capacitor cover; 2—insulator preventing capacitor electrodes from electric contact to each other; 3—metal current lead; 4—current lead protective coating made from graphite foil; 5—negative polarizable porous carbon electrode; 6—dielectric separator; 7—positive electrode; 8—acid-resistant sealant; 9—load-bearing walls of the capacitor casing.

EXEMPLARY EMBODIMENTS OF THE INVENTION

EXAMPLE 1

A DEL capacitor (FIG. 1) is made in accordance with the present invention, comprising a negative electrode (5) consisting of sixteen plies of activated carbon fabric, type "Viscumac" having a specific surface area of 1200 sg.m/g and a 300 micron thickness of each ply; a positive electrode (7) 2 mm thick having an active material containing lead sulfate and being forced into a grid made from an alloy containing 95% lead and 5% antimony; a porous separator (6), grade ФIIII-20CA, made from perchlorovinyl having a total thickness of 120 microns; current leads (3, 4) made of sheet steel; a 3 mm thick steel load-bearing cover (1) of the casing; a 0.3 mm thick load-bearing side panels (9) of the casing; and a dielectric sealant (8).

The negative and positive porous electrodes and the porous separator are impregnated with electrolyte, i.e., an aqueous sulfuric acid having a density of 1.05 g/cu.cm. The protective coating (4) of the current lead is made of a 0.3 mm thick graphite foil impregnated with an acid-resistant polymer and adhesive-bonded at several points to the metal electrode of the current lead. Both electrodes appear as plates each measuring 123×143 mm. A set of the electrodes and separator is compressed at a pressure of 10 kg/sq.cm.

Figure 2:
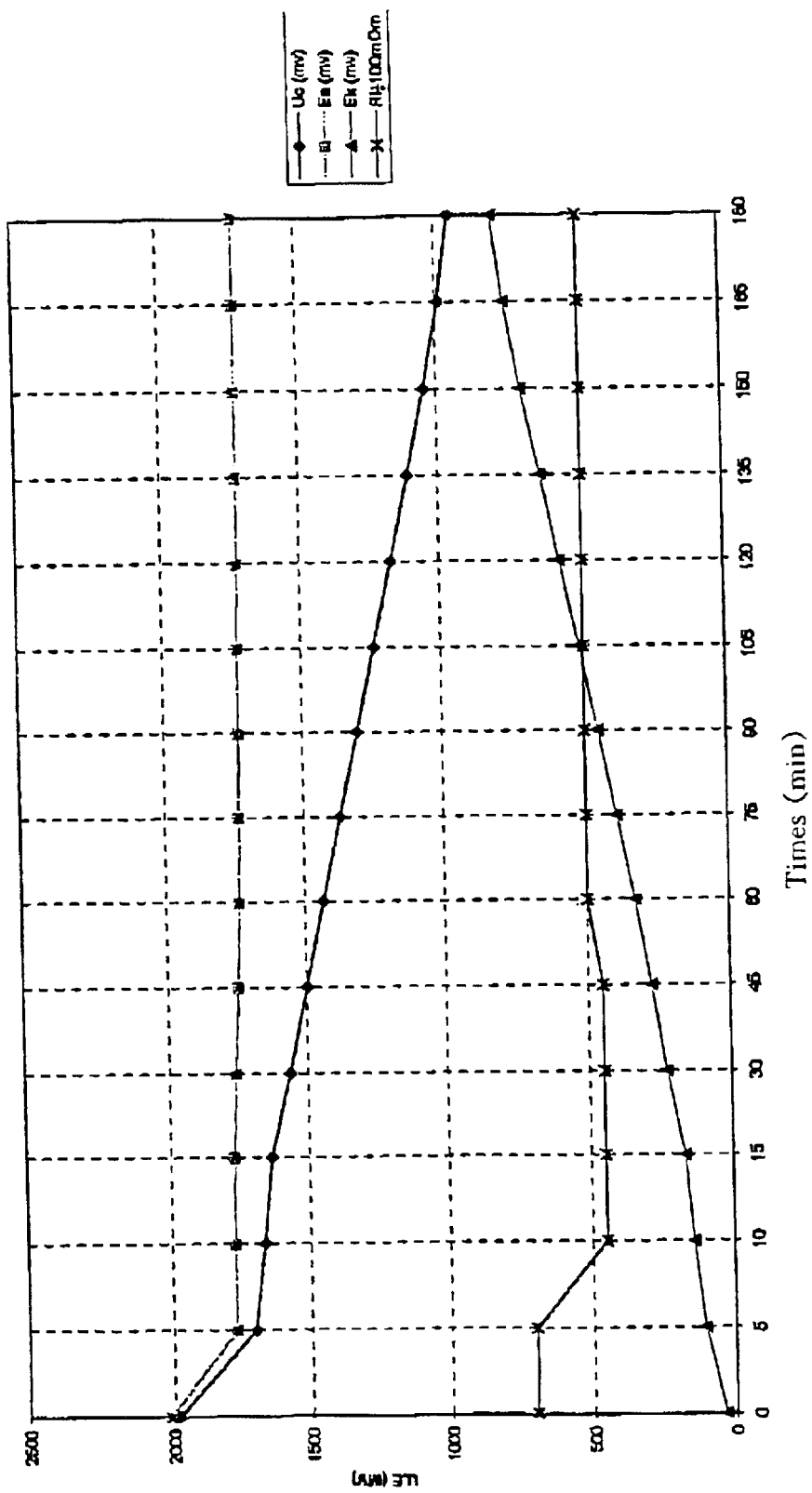
FIG. 2 illustrates graphic representation of voltage and potentials of the electrodes vs discharge time.

FIG. 2 illustrates graphic representation of voltage Uc and the positive electrode potential Ea and the negative electrode potential Ec (relative to the hydrogen electrode in the same solution) vs discharge time t. The characteristic curves are measured at 20° C. and a current of 10 A.

The aforesaid relationships enables one to draw the following inferences:
(1) The positive electrode potential decreases but very little during the discharge process.
(2) The negative electrode potential increases nearly linearly during the discharge process until E is 1.0 V.
(3) As a result, the discharge curve in an interval of voltages below 1.8 V approximates a linear aspect inherent in capacitors.
(4) Maximum voltage (Umax) is approximately 2 V.

Insofar as with the potentials exceeding 1 V carbon electrodes are liable to oxidize at a rather high rate, so minimum discharge voltage Umin occurs when (E)max=1 V. It is evident from FIG. 2 that for a given capacitor Umin=0.7 V.

The following characteristics are obtained as a result of testing: specific energy, 53.4 W-h/lit; the number of the charging-discharge cycles obtained, 6500 (after which the testing was continued).

EXAMPLE 2

Figure 3:
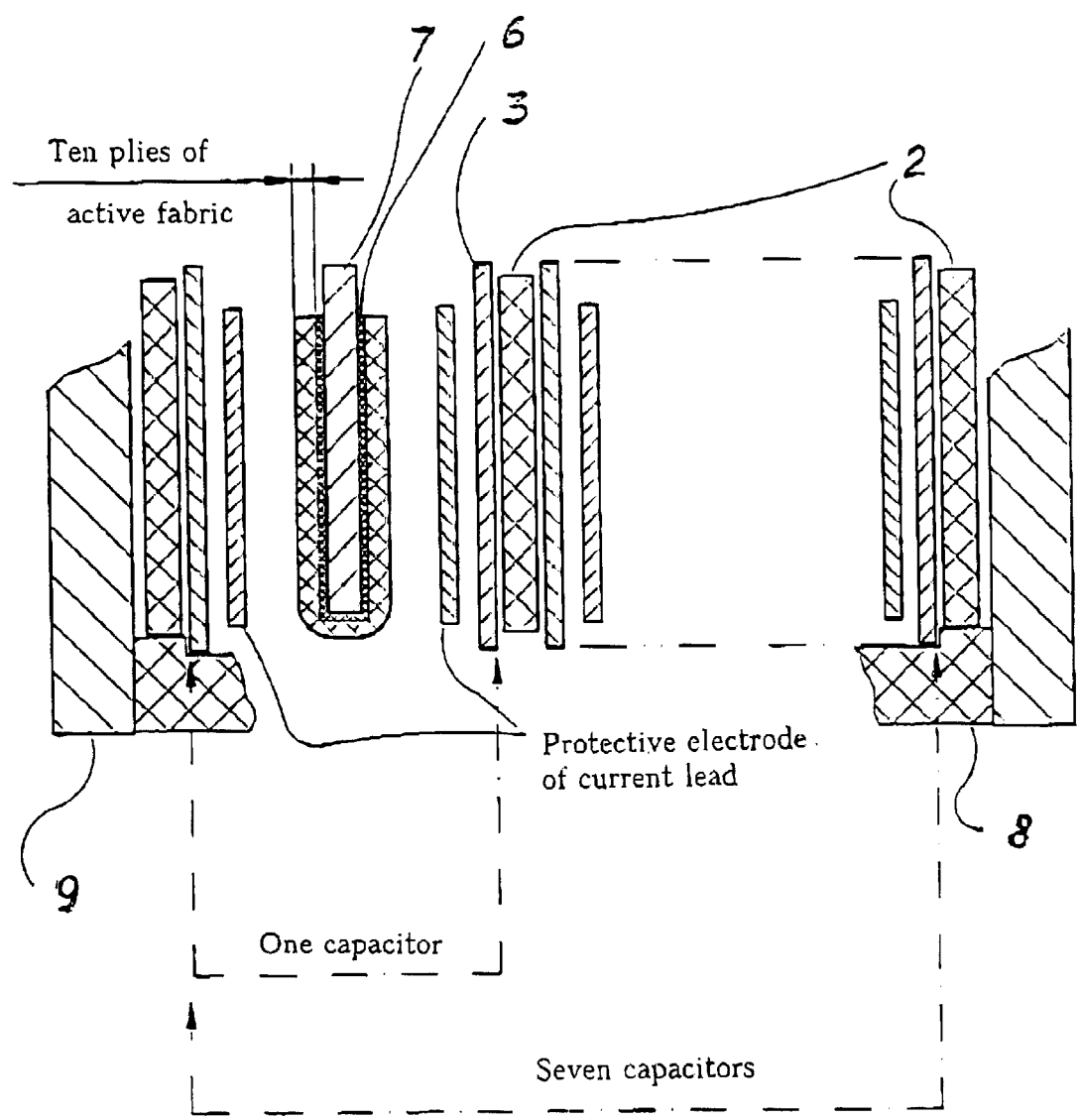
FIG. 3 illustrates a schematic diagram of a bank of capacitors assembled from the capacitor elements according to the present invention.

A bank of DEL capacitors is manufactured, comprising seven similar series-connected elementary capacitors made according to the present invention and compressed together between the lead-bearing covers and the side panels of the casing. FIG. 3 illustrates a schematic diagram of such a bank of capacitors. Each elementary capacitor consists of two identical negative electrodes and a positive electrode interposed therebetween. The positive electrode is put in an envelope-shaped separator. Both of the negative electrodes are electrically closed together through external switching. The overall dimensions of the entire assembly: 130×150× 64.4 mm. The negative electrode is made by molding and sintering a mixture comprising 8 wt. % of powdered polyethylene and 92 wt. % of grade Al-3 activated powdered carbon having a specific surface area of 1100 cu.mg, the negative thickness being 3 mm. The positive electrode comprises a grid made of an alloy containing 95% lead and 5% antimony. Put inside the grid cells is a mixture comprising 93% lead sulfate and 7% polytetrafluoroethylene. A 60 micron thick, grade ФIIII-20CA, perchlorovinyl separator is used. The protective coatings of the current leads of the negative electrodes is similar to those of Example 1.

The following characteristics are obtained as a result of testing: specific energy, 51 W-h/lit with a discharge current of 2.5 A; the number of the charging-discharge cycles obtained, 6500; the internal resistance, 18 mOhm.

INDUSTRIAL APPLICABILITY

Use of the present invention makes possible attaining the specific energy of the proposed capacitor exceeding several times that of the known DEL capacitors, while the cost thereof is several times lower than that of the known capacitors. The proposed capacitor allows performing series and parallel connections of the elements and to provide on its base various capacitor banks.

What is claimed is:
1. A dual electric layer capacitor, characterized in that it comprises:

at least one polarizable electrode which is made from a porous carbon material;

a non-polarizable electrode which is made from a material containing lead sulfate; and electrolyte appearing as an aqueous solution containing sulfuric acid, and a current lead having a potective coating made of graphite foil impregnated with an acid-resistant polymer.

2. A capacitor according to claim 1, characterized in that it further comprises two polarizable electrodes, one non-polarizable electrode, and two separators, all of said components being arranged in the following order: the first polarizable electrode/the first separator/the non-polarizable electrode/the second separator/the second polarizable electrode, both of the polarizable electrodes being short-circuited on each other.

3. A capacitor according to claim 1, characterized in that at least one electrode comprises a particulate polymer.

4. A capacitor according to claim 1, CHARACTERIZED in that it is subjected to compression.

* * * * *